United States Patent
Lee et al.

(10) Patent No.: US 8,207,987 B2
(45) Date of Patent: Jun. 26, 2012

(54) METHOD AND APPARATUS FOR PRODUCING DIGITAL CARTOONS

(75) Inventors: Ji Hyung Lee, Daejeon (KR); Bon Ki Koo, Daejeon (KR); Bo Youn Kim, Daejeon (KR); Hee Jeong Kim, Daejeon (KR); Yoon-Seok Choi, Daejeon (KR); Il Kyu Park, Daejeon (KR); Seung Wook Lee, Daejeon (KR); Hwan-gue Cho, Pusan (KR); Dong-Sung Ryu, Pusan (KR); Won-Il Hwang, Pusan (KR); Bong-Kyung Chun, Pusan (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 891 days.

(21) Appl. No.: 12/292,073

(22) Filed: Nov. 12, 2008

(65) Prior Publication Data

US 2009/0135198 A1 May 28, 2009

Related U.S. Application Data

(60) Provisional application No. 60/988,448, filed on Nov. 16, 2007.

(30) Foreign Application Priority Data

Dec. 17, 2007 (KR) .................. 10-2007-0132854

(51) Int. Cl.
G09G 5/00 (2006.01)
(52) U.S. Cl. ...................... 345/619; 345/629
(58) Field of Classification Search .......... 345/629, 345/619
See application file for complete search history.

(56) References Cited

U.S. PATENT DOCUMENTS

| | | | | |
|---|---|---|---|---|
| 5,724,072 | A | * | 3/1998 | Freeman et al. ............... 345/648 |
| 6,069,622 | A | * | 5/2000 | Kurlander ...................... 715/753 |
| 2002/0003631 | A1 | * | 1/2002 | Abram et al. .................. 358/1.9 |
| 2002/0008622 | A1 | * | 1/2002 | Weston et al. ............. 340/572.1 |
| 2003/0222875 | A1 | * | 12/2003 | Kawakami et al. ........... 345/473 |
| 2006/0258419 | A1 | * | 11/2006 | Winkler et al. .................... 463/1 |
| 2008/0284791 | A1 | * | 11/2008 | Bressan et al. ................ 345/589 |

FOREIGN PATENT DOCUMENTS

| | | |
|---|---|---|
| KR | 10-2000-0049396 | 8/2000 |
| KR | 10-2002-0025448 | 4/2002 |
| KR | 10-2005-0082859 | 8/2005 |

(Continued)

OTHER PUBLICATIONS

Chun et al., "An automated procedure for word balloon placement in cinema comics", Advances in visual computing: second international symposium, IVSC Nov. 2006, pp. 576-585.*

(Continued)

*Primary Examiner* — Michelle L Sams
(74) *Attorney, Agent, or Firm* — Lowe Hauptman Ham & Berner, LLP

(57) ABSTRACT

An apparatus for producing digital cartoons includes: an image collection unit for collecting photorealistic image data; and a cartooning processor for performing a rendering process including image abstraction and edge generation on the photorealistic image data collected by the image collection unit to generate cartooned images. The apparatus further includes a stylization unit for producing a cartoon page having various shapes of cartoon frames, resizing the cartooned images to place the resized images into the cartoon frames and adding cartoon elements to the images placed in the cartoon frames.

14 Claims, 7 Drawing Sheets

FOREIGN PATENT DOCUMENTS

KR    10-2006-0030179    4/2006

OTHER PUBLICATIONS

Comaniciu et al., "Mean shift: a robust approach toward feature space analysis", IEEE Trans. on pattern analysis and machine intelligence, 2002.*

Fisher et al., "Laplacian/Laplacian of Gaussian", http://homepages.inf.ed.ac.uk/rbf/HIPR2/log.htm. 2003.*

DeCarlo et al., "Stylization and abstraction of photographs", ACM SIGGRAPH 2002, pp. 769-776.*

Tomasi et al., "Bilateral filtering for gray and color images", Proceedings of 1998 IEEE International Conference on Computer vision, 1998.*

"An Automated Procedure for Word Balloon Placement in Cinema Comics", Bong-Kyung Chun et al., LNCS 4292, pp. 576-585, Nov. 17, 2006 (presentation at ISVC 2006 Lake Tahoe, NV, U.S.A., Nov. 6-8, 2006).

Dong-Sung Ryu et al., "Black and White Cartoon Generation System based on the Video Images", Journal of the Korean Institute of Information Scientists and Engineers, vol. 34, No. 2 (B), 2007, 7 pages (w/English abstract), Korea.

* cited by examiner

FIG.3
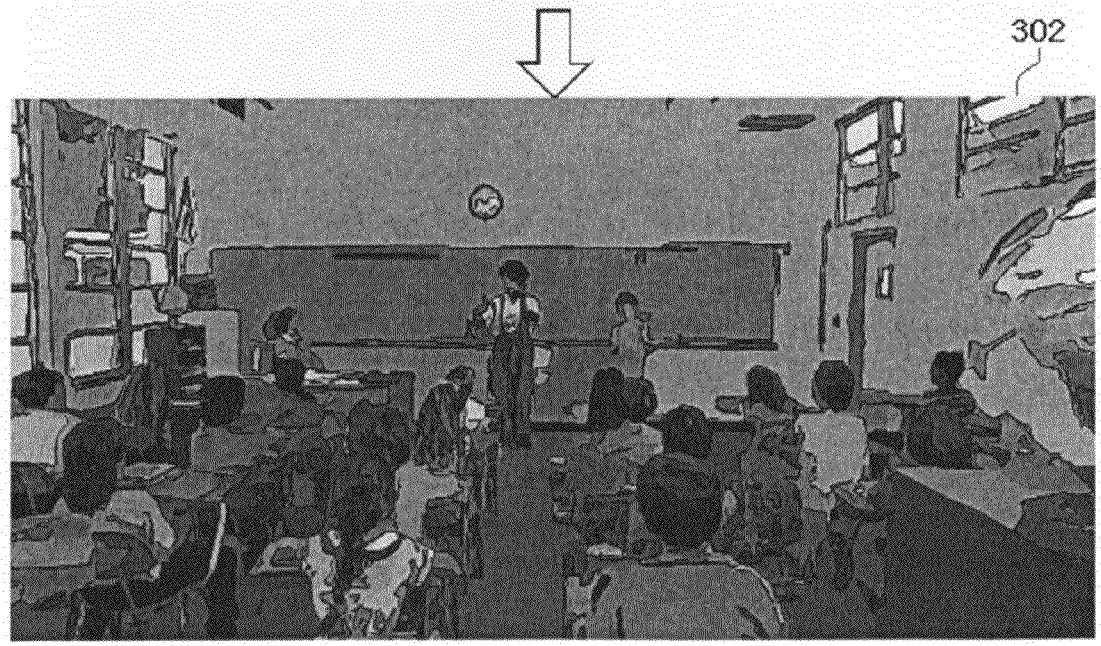

FIG.6
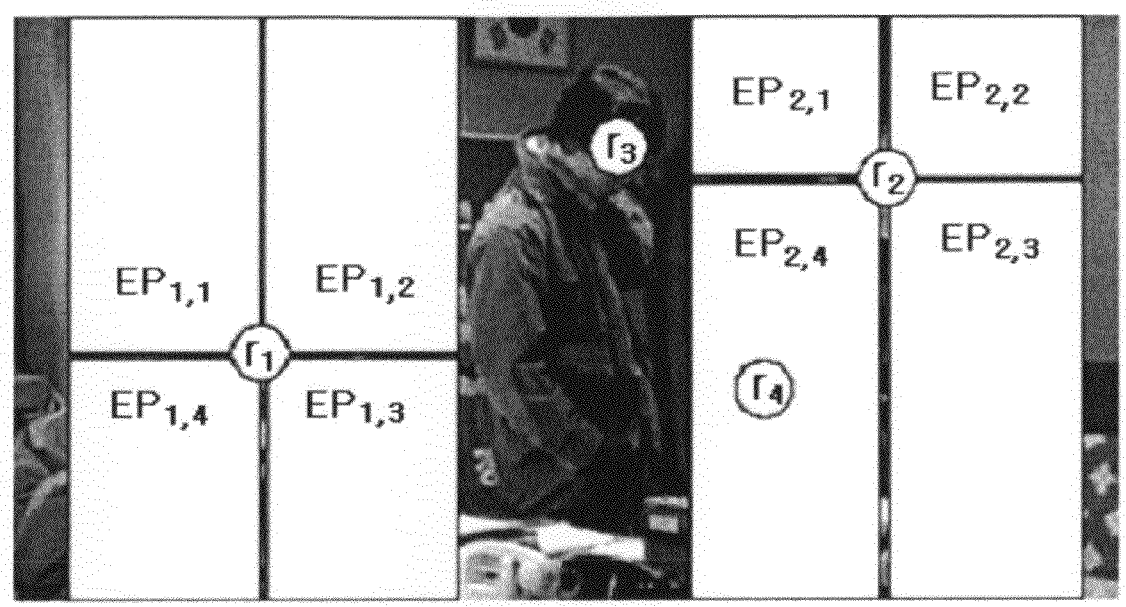
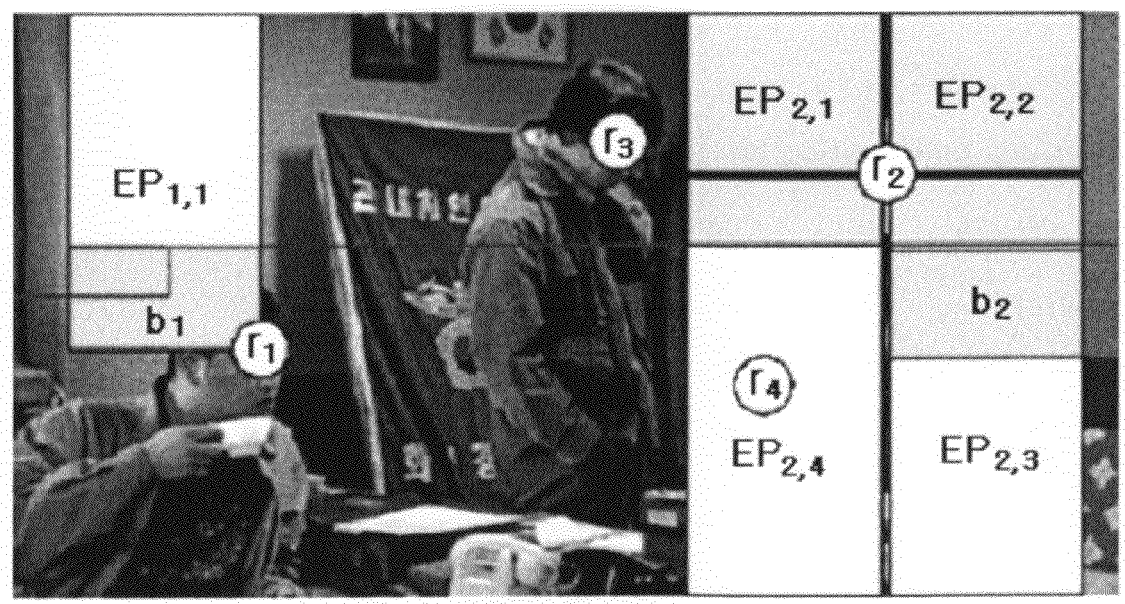

METHOD AND APPARATUS FOR PRODUCING DIGITAL CARTOONS

CROSS-REFERENCE(S) TO RELATED APPLICATION(S)

The present invention claims priority of U.S. Provisional Patent Application No. 60/988,448, filed on Nov. 16, 2007, and Korean Patent Application No. 10-2007-0132854, filed on Dec. 17, 2007, which are incorporated herein by reference.

FIELD OF THE INVENTION

The present invention relates to a method and apparatus for producing cartoons; and, more particularly, to a method and apparatus capable of easily producing digital cartoons through a stylizing process and a cartooning process for rendering moving pictures such as movies or images such as common photographs into cartoon images.

This work was supported by the IT R&D program of MIC/IITA. [2005-S-082-03, Development of Non-Photorealistic Animation Technology]

BACKGROUND OF THE INVENTION

A cartoon is called a ninth art and is a medium familiar to ordinary persons. However, in conventional techniques, all processes of producing cartoons are manually performed. Accordingly, ordinary persons other than persons who are good at drawing or cartoonists cannot easily produce the cartoons.

The recent development of computers and content production techniques has led to automation of cartoon production. One of representative automation techniques studied in image processing and computer graphics is non-photorealistic rendering, which is a technique for converting photorealistic images into images like freehand drawings. However, these techniques are very difficult to use in cartoon production because it is not dedicated to the cartoon.

In general, cartoons have excellent information delivery capability and are compressed forms having a relatively small data amount. The cartoon easily represents character's emotions and delivers cartoonists' intentions using cartoon elements, e.g., exaggerated actions, exaggerated backgrounds, word balloons and the like. Ordinary users necessitate a system for enabling them to easily use cartoon elements to produce cartoons. However, such a system is not common and user-friendly.

In this environment, ordinary users who are not good at drawing still consider the cartoon production to be impossible because they cannot easily create picture materials.

Meanwhile, in a conventional cartoon production method, limited image resources in a previously built database (DB) are combined to produce cartoons. This does not allow users to produce creative cartoons. Even if the cartoon is produced using photorealistic photographs, the photographs are placed and adjusted and then cartoon elements, e.g., word balloons, are just added thereto. As a result, completed cartoons greatly differ from typical cartoons.

SUMMARY OF THE INVENTION

In view of the above, the present invention provides a method and apparatus capable of properly producing digital cartoons through a cartooning process for rendering photorealistic images into cartoon images and a stylizing process for placing the images like cartoons and inserting cartoon elements.

In the present invention, common photorealistic photographs are used as picture materials for cartoons and converted into cartoon-like forms through the cartooning process, thereby overcoming a problem of picture material creation.

The method and apparatus of the present invention automates a manual cartoon production process, is user-friendly for more efficient cartoon production, and ultimately allows ordinary users who are not good at drawing to produce cartoons.

In accordance with an aspect of the present invention, there is provided an apparatus for producing digital cartoons, the apparatus including: an image collection unit for collecting photorealistic image data; a cartooning processor for performing a rendering process including image abstraction and edge generation on the photorealistic image data collected by the image collection unit to generate cartooned images; and a stylization unit for producing a cartoon page having various shapes of cartoon frames, sizing the cartooned images to place the resized images into the cartoon frames and adding cartoon elements to the images placed in the cartoon frames.

In accordance with another aspect of the present invention, there is provided a method for producing digital cartoons, the method including: collecting photorealistic image data; performing a cartooning process on the photorealistic image data to generate a cartooned image; and performing a stylization process on the cartooned image to complete a cartoon page.

According to the present invention, a digital cartoon is produced by rendering input images such as common photographs or moving pictures and adding cartoon elements thereto. Accordingly, the cartoon can be produced without a drawing process, and thus everyone, not only cartoonists, can easily produce cartoons.

Further, various cartoon illustrations or other images, as well as digital cartoons can be produced by adjustment of image abstracting suggested in the present invention. Since the prevent invention can be utilized in content production in all industries that use images, it is possible to be widely applied to image production.

BRIEF DESCRIPTION OF THE DRAWINGS

The above features of the present invention will become apparent from the following description of embodiments, given in conjunction with the accompanying drawings, in which:

FIG. 3 illustrates an exemplary cartooned image in accordance with the embodiment of the present invention;

FIG. 6 illustrates an exemplary view of automatic placement upon insertion of cartoon elements in accordance with the embodiment of the present invention.

DETAILED DESCRIPTION OF THE EMBODIMENT

Hereinafter, embodiments of the present invention will be described in detail with reference to the accompanying drawings, which form a part hereof.

Figure 1:
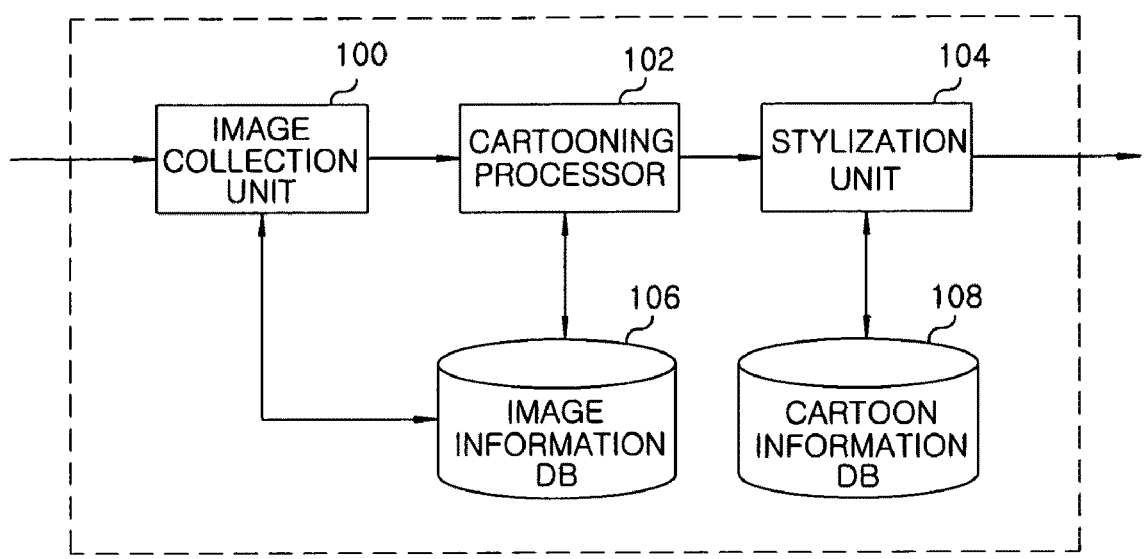
FIG. 1 illustrates a block diagram of an apparatus for producing digital cartoons in accordance with an embodiment of the present invention.

FIG. 1 illustrates a block diagram of an apparatus for producing digital cartoons in accordance with an embodiment of the present invention. The apparatus of the present invention includes an image collection unit 100, a cartooning processor 102 and a stylization unit 104. The apparatus may further include an image information DB (database) 106 and a cartoon information DB 108.

Below, operation of respective units of the apparatus for producing digital cartoons will be described in detail with reference to FIG. 1.

First, the image collection unit 100 collects image data by receiving photographs taken by a digital camera, photograph materials obtained via the Internet or photorealistic photograph materials extracted from images of primary scenes of a two-dimensional moving picture such as a movie or drama.

Since the image required for cartoon production is obtained by using the digital camera or by extracting images from primary scenes of a moving picture, which may be performed by an ordinary user having no particular skill or equipment. The image collection unit 100 collects image data received by the above method and stores the collected image data in the image information DB 106 to use the image data when required. The image information DB 106 is merely for storing therein image data, and thus is not restricted to specific types.

The cartooning processor 102 performs a rendering process using the image data collected by the image collection unit 100 to obtain cartooned images. Most photograph materials obtained by the image collection unit 100 are photorealistic photographs, and are difficult to directly use in the cartoon production. The realistic image and the cartoon image greatly differ in color abstraction and edge representation. Accordingly, the cartooning processor 102 performs image abstraction and edge generation processes on the image data collected by the image collection unit 100 to produce the cartooned images.

The stylization unit 104 receives the cartooned images from the cartooning processor 102, and completes the cartoon by using the cartooned images. To be specific, the stylization unit 104 produces a cartoon frame, adjusts and places the cartoon images in the cartoon frame, and inserts cartoon elements such as word balloons into the cartoon frame.

One page of the cartoon may include several frames. Each frame represents one scene and serves as a unit that allows omission, which is a feature of the cartoon, to thereby excite reader's imagination. In producing one page of the cartoon, frames are produced and then filled with images. According to the present invention, the stylization unit 104 completes frames of a page of the cartoon by fetching several predefined templates for the frames from the cartoon information DB 108, applying the templates to the page and then adjusting a size of each frame.

After the frames of one page are completed, the cartooned image is placed in each frame. The placed image is then resized and moved to complete a scene in the frame. Since the image resizing and movement are performed using typical algorithms, details thereof will not be further described.

Figure 2:
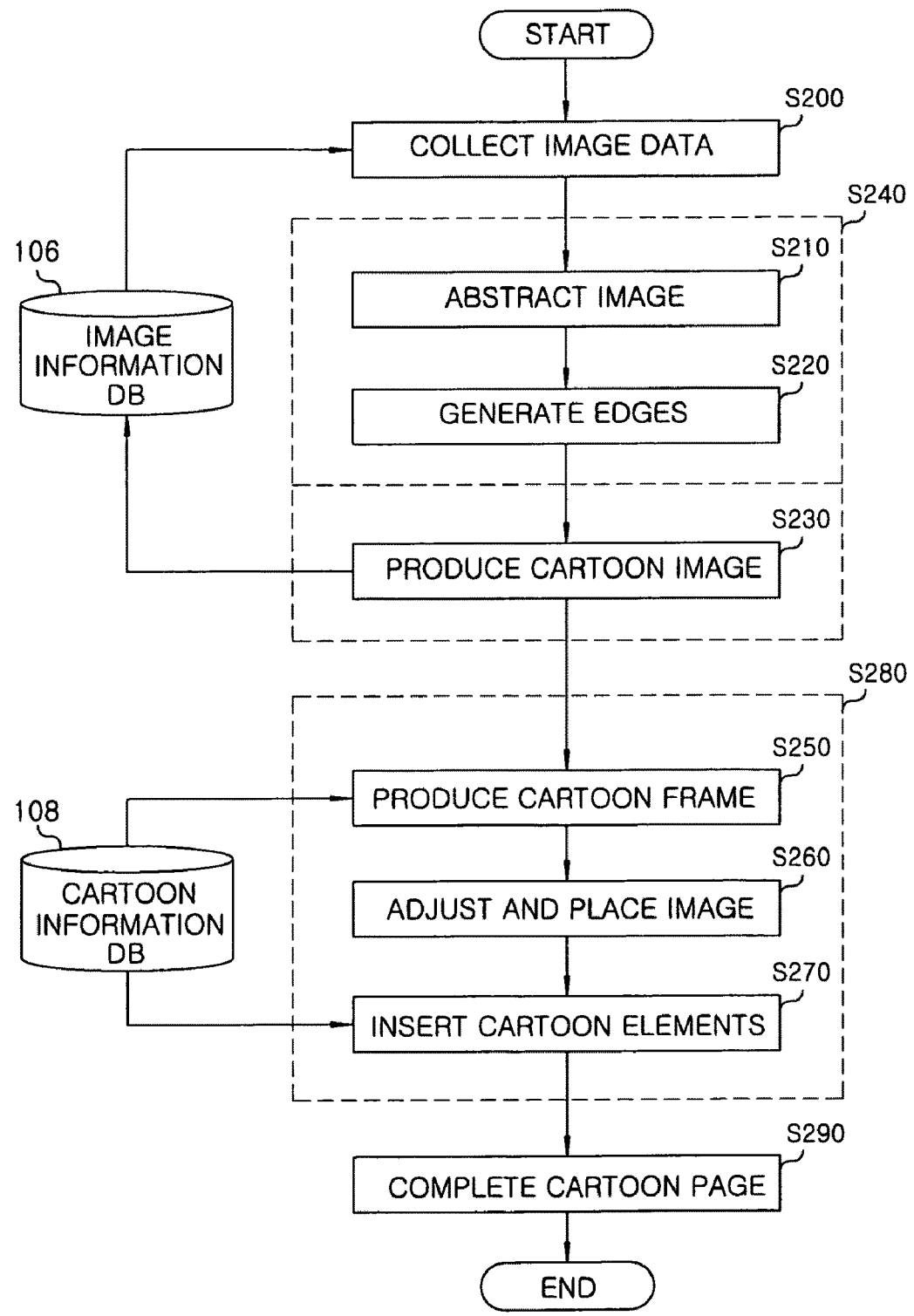
FIG. 2 illustrates an operation control flow of producing digital cartoons in accordance with the embodiment of the present invention.

FIG. 2 illustrates an operation control flow of producing digital cartoons in accordance with the embodiment of the present invention. Now, the embodiment of the present invention will be described in detail with reference to FIGS. 1 and 2.

First, an image data collection step S200 is carried out by the image collection unit 100 to collect photographs taken by a digital camera, photograph materials obtained via the Internet, or photorealistic photograph materials extracted from images of primary scene of two-dimensional moving pictures. In the step S200, the image data inputted to the image collection unit 100 may be obtained by using a conventional image extraction program by an ordinary user having no particular technique or equipment. The image collection unit 100 stores the collected image data in the image information DB 106, and fetches the data when required.

Meanwhile, since most of the photograph materials obtained in the step S200 are photorealistic photographs, it is difficult to directly use them in the cartoon production. That is because the realistic image and the cartoon image differ in color abstraction and edge representation.

Accordingly, in a cartooning step S240, the image data collected in the step S200 passes through an image abstraction step S210 and an edge generation step S220 to produce a cartooned image as described in the cartooning processor 102.

The image abstraction step S210 and the edge generation step S220 will be described in detail below.

In the image abstraction step S210, colors in the photorealistic photograph are simplified to process the photorealistic photographs into a cartoon, e.g., by using a bilateral filtering and a mean-shift segmentation in the present invention.

The bilateral filtering basically performs image smoothing in consideration of signal differences in an image as well as spatial distances. Therefore, unlike a typical Gaussian filtering, smoothing is not performed on an edge area having high color contrast while strong smoothing is performed in an area with similar colors in the bilateral filtering. Briefly, the bilateral filtering is a process for performing smoothing while conserving the edges.

Given an image function $f$ consisting of RGB channels, a bilateral filter may obtain an abstracted image h using Equation 1:

$$h(x) = k^{-1}(x) \int_{-\infty}^{\infty} \int_{-\infty}^{\infty} f(\xi) c(\xi, x) s(f(\xi), f(x)) d\xi \qquad \text{Equation 1}$$

In Equation 1, x denotes a pixel coordinate in the abstracted image. A pixel value of this coordinate, h(x), is obtained by integrating pixels $\xi$ adjacent to x in a two-dimensional image. In the case of a discrete form as in an image processed in a computer rather than a continuous form, the pixel value h(x) is equal to the weighted sum of the neighboring pixels $\xi$, wherein the weight is represented by the product of $c(\xi,x)$ and $s(f(\xi),f(x))$. Here, $c(\xi,x)$ and $s(f(\xi),f(x))$ are functions relating to a vector difference $\xi-x$ and a vector difference $f(\xi)-f(x)$ of color channels, respectively. That is, $c(\xi,x)$ reflects, spatial, features and $s(f(\xi),f(x))$ reflects color strengths. Generally, the functions c and s are Gaussian functions as in Equations 2-1 and 2-2, respectively:

$$c(\xi, x) = e^{-\frac{1}{2}\left(\frac{|\xi-x|}{\sigma_d}\right)^2} \qquad \text{Equation 2-1}$$

$$s(f(\xi), f(x)) = e^{-\frac{1}{2}\left(\frac{|f(\xi)-f(x)|}{\sigma_r}\right)^2} \qquad \text{Equation 2-2}$$

$c(\xi,x)$ is a Gaussian function of an Euclidean distance between $\xi$ and x, and $s(f(\xi), f(x))$ is a Gaussian function that depends on color strengths of $f(s)$ and $f(x)$ Standard deviations $v_d$ and $v_r$ of the Gaussian functions are parameters for determining a degree and property of the smoothing procedure, which are set by a user. In order to maintain overall brightness of the input image and the abstracted image to be same, the integration result is divided by a normalization factor $k(x)$, wherein $k(x)$ is represented by Equation 3:

$$k(x) = \int_{-\infty}^{\infty} \int_{-\infty}^{\infty} c(\xi, x) s(f(\xi), f(x)) d\xi \qquad \text{Equation 3}$$

In consequence, since the bilateral filtering considers a difference in color strength from a neighboring pixel as a weight, unlike a typical smoothing filtering considering only the spatial distance, smoothing can be performed only in an area where neighboring pixels have similar colors, i.e., an area where the value $f(\xi) - f(x)$ is small. Accordingly, the smoothing effect is reduced in an area where a pixel differs in color from neighboring pixels.

In summary, the present invention employs the bilateral filter to abstract an area having similar colors while conserving an area, e.g., an edge, where the color contrast is high as it is. By repeatedly performing bilateral filtering, more abstracted images can be obtained.

In order to reflect a cartoon property, abstracted areas in the abstracted image are grouped to be processed. In the present invention, mean-shift segmentation is used. In a typical segmentation method, pixels of the input image are mapped to a feature space (e.g., a color space) and similar areas in the image are grouped. Because a multivariate normal distribution is used as a feature space model, the traditional grouping method have drawbacks in that the groups need to be elliptic shapes or user's wrong determination of a group number causes severe shortcomings. By contrast, the mean-shift segmentation is based on nonparametric feature space analysis, thereby reducing the above-described drawbacks. When $f(x)$ is a p-dimensional unknown probability density function and $x_i$ is data in this space, a mean-shift property is obtained as in Equation 4:

$$\overline{\nabla f(x)} \sim (\text{ave}_{x_i \in S_{h,x}}[x_i] - x) \qquad \text{Equation 4}$$

In Equation 4, $S_{h,x}$ denotes an area of a p-dimensional sphere with a center point x and a radius h. It can be seen that a density gradient $\overline{\nabla f(x)}$ in a location x means an average vector difference between x and points in a specific window having a center point x (i.e., an area $S_{h,x}$).

By repeatedly applying the mean-shift based on Equation 4, a mode having a local maxima in the density, i.e., a point at which $\nabla f(x)$ is zero, can be found. Such mode can be found by moving the window $S_{h,x}$ along the mean-shift vector until the mean-shift vector values are smaller than a specific boundary value.

Accordingly, points in the abstracted image may be grouped centering modes of convergence points by performing the mean-shift process on all points in the feature space. The areas of groups grouped by the modes may have any shape, and the number of the groups in the feature space is automatically determined by the number of the discovered modes.

In the present invention, a five-dimensional feature space is used to apply the mean-shift segmentation to a color image. First, a three-dimensional space is used as a color space L*U*V, and other two-dimensional space is used as an image grid coordinate space. Since differences between colors in the color space L*U*V satisfies Euclidean, a spherical window may be used. The use of such five-dimensional feature space allows grouping of pixels having similar color and located at continuous locations in the color image. Here, segmentation quality is adjusted by a color resolution $h_r$ and a spatial resolution $h_s$ which is a resolution parameter of the feature space to be analyzed and serves to define radiuses of windows in the three-dimensional and the two-dimensional domains.

The mean-shift segmentation includes filtering and fusion procedures. In the filtering procedure, all pixel values associated with the modes found using five-dimensional mean-shift vectors are converted into an L*U*V color values of the modes. In the fusion procedure, the filtered images are repeatedly fused until basins of the modes within $h_r/2$ in the color space converge. Thereafter, all the pixel values in the fused area are set to an average thereof.

In order to make thus simplified image to resemble a cartoon, an edge generation step S220 is performed, in which the Laplacian filter and the Canny edge detection are used in the present invention.

The Laplacian filter is a second-order differential edge detection method. The Laplacian filter prevents sensitive reaction at edges laid on horizontal, vertical and diagonal directions, which occurs in first-order differential edge detection method such as Sobel, Prewitt and Roberts. The Laplacian filter also prevents detection of too many edges. When using the first-order differential edge detection, areas above a specific boundary value are much widely distributed. By contrast, the second-order differential edge detection method such as Laplacian filter performs an additional differentiation after the first-order differentiation to find a zero-crossing point, thereby finding sharp and clear edges. In obtaining a 3×3 mask, the Laplacian filter is defined as in Equation 5:

$$\nabla^2 f = \frac{\partial^2 f}{\partial^2 x^2} + \frac{\partial^2 f}{\partial^2 y^2}, \qquad \text{Equation 5}$$

$$\frac{\partial^2 f}{\partial^2 x^2} = (f[i, j+2] - f[i, j+1]) -$$
$$(f[i, j+1] - f[i, j])$$
$$= f[i, j+2] - 2f[i, j+1] + f[i, j],$$

$$\frac{\partial^2 f}{\partial^2 y^2} = (f[i+2, j] - f[i+1, j]) - (f[i+1, j] - f[i, j])$$
$$= f[i+2, j] - 2f[i+1, j] + f[i, j]$$

By using Equation 5, a 3×3 Laplacian mask as in Equation 6 can be derived. In the present invention, Laplacian masks having several sizes including 5×5 or 7×7 as well as a 3×3 mask may be used.

$$\nabla^2 = \begin{array}{|c|c|c|} \hline 0 & 1 & 0 \\ \hline 1 & -4 & 1 \\ \hline 0 & 1 & 0 \\ \hline \end{array} \qquad \text{Equation 6}$$

The Laplacian filter is intrinsically vulnerable to noise, since edges are detected using differences from ambient brightness. Accordingly, in the present invention, edges are detected in the edge generation step S220 using the abstracted images.

The Canny edge detection enhances a typical noise sensitive edge detection mask to detect strong and noise nonsensitive edges. The Canny edge detection is known as an optimal edge detection method and required to meet the three criteria below:

1. Good detection: All actual edges should be detected.
2. Good localization: Difference between an actual edge and a detected edge should be minimized.
3. Clear response: Each edge should have single response.

A cartooned image is produced (step S230) through the image abstraction step (S210) and the edge generation step (S220).

FIG. 3 illustrates a cartooned image created by applying the image abstraction (the bilateral filtering and the mean-shift segmentation) and the edge generation (the Laplacian filter and the canny edge detection) in accordance with the embodiment of the present invention. As shown in FIG. 3, the photorealistic image data 300 inputted via the image collection unit 100 is converted into a cartoon-like image 302 by unifying similar colors in the image abstraction step S210 and generating the edges in the edge generation step S220. The cartoon-like images 302 are stored in the image information DB 106 and used in a subsequent stylization step S280.

Figure 4:
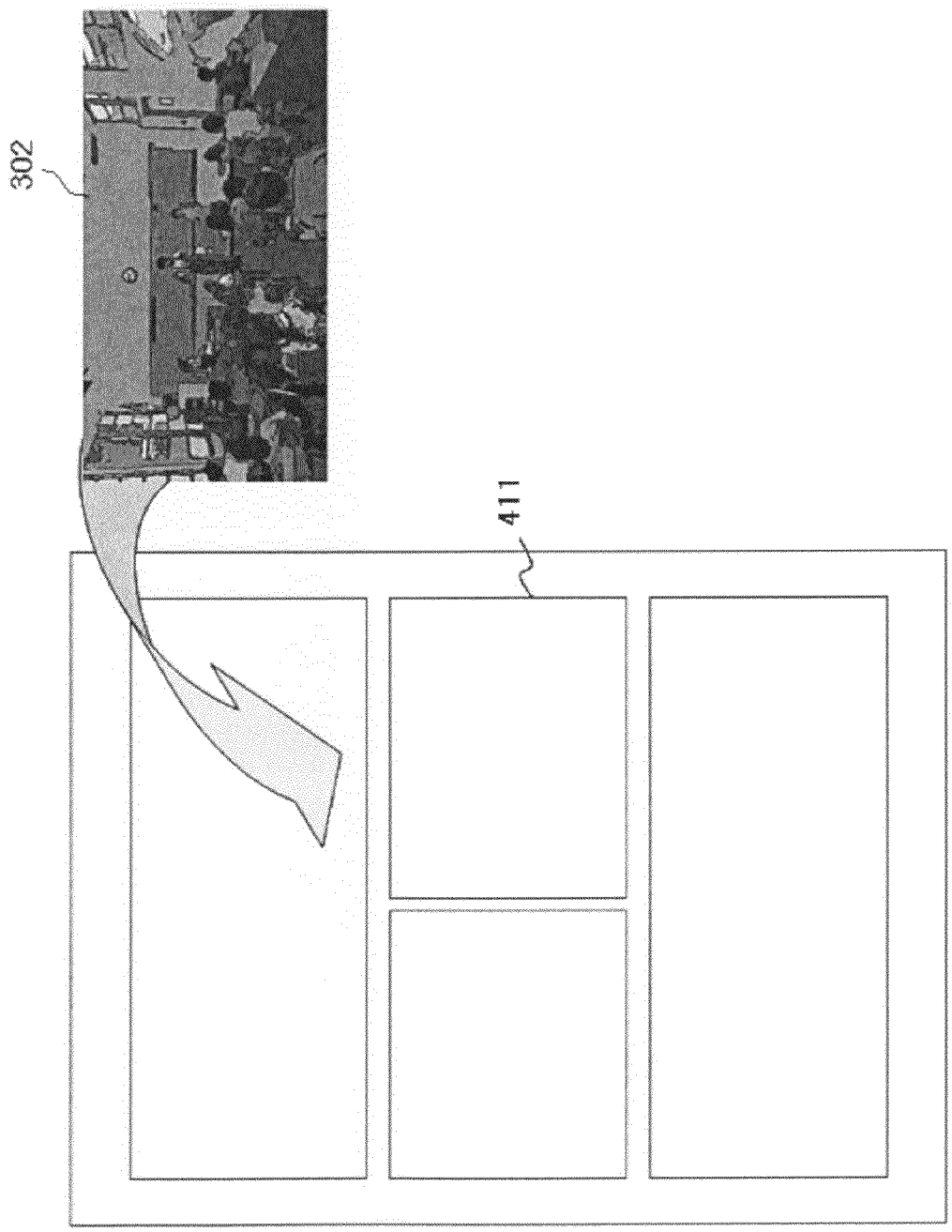
FIG. 4 illustrates an exemplary view of placing an image into a cartoon frame in accordance with the embodiment of the present invention.

The cartoon stylization step S280, which may be executed by the stylization unit 104, includes a cartoon frame production step S250, an image adjustment/placement step S260 and a cartoon element insertion step S270. As shown in FIG. 4, each page of the cartoon includes several frames 411. Each frame represents one scene and serves as a unit allowing omission, which is a feature of the cartoon, to thereby excite reader's imagination. In producing one page of the cartoon, frames are produced and then filled with images. In the present invention, the frames of a page of the cartoon is completed by fetching several predefined templates for the frames from the cartoon information DB 108, applying the templates to the page and then adjusting the size of each frame.

After the frames of one page are completed through the cartoon frame production step S250, the cartooned image 302 is placed in each frame in the image adjustment/placement step S260. The placed image is then magnified and moved to complete a scene in the frame. Since the image magnification and movement are performed using typical algorithms, details thereof will not be described.

Figure 5:
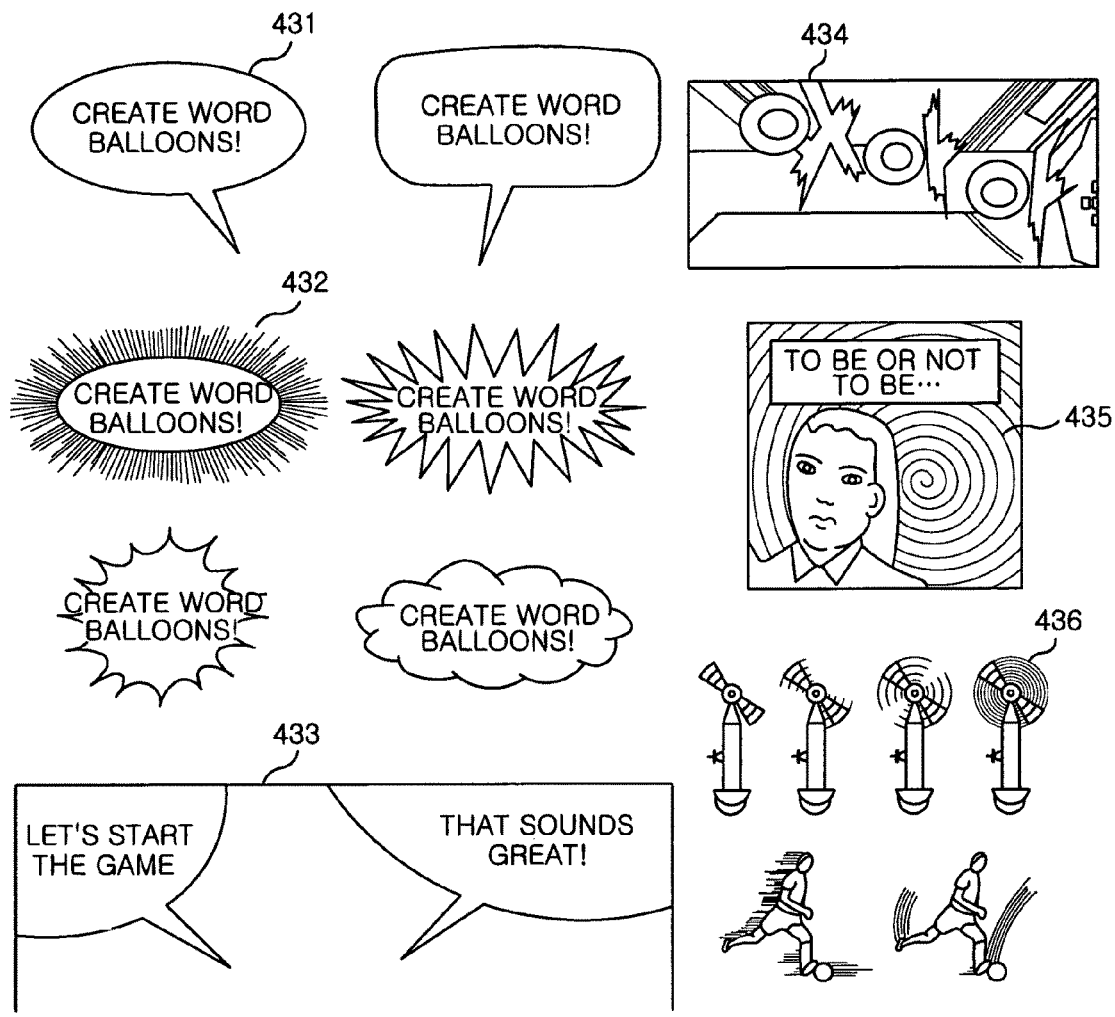
FIG. 5 illustrates various exemplary cartoon elements in accordance with the embodiment of the present invention.

In the cartoon element insertion step S270, the cartoon elements are inserted to complete cartoon stylization. The inserted cartoon elements include word balloons 431 to 433, exaggerated letters 434, an exaggerated background 435 and a speedline 436, as shown in FIG. 5.

Generally, a word balloon in a cartoon is a requisite element to describe a story of the cartoon and serves to couple a hero/heroine of the cartoon with his/her lines. Many types of word balloons are used in the cartoon to represent a current state or a mental state of the hero/heroine. In the present invention, templates of word balloon most frequently used in typical cartoons are modeled. The word balloons are classified into, based on modeling methods, elliptical word balloons 431, shouting word balloons 432 and boundary word balloons 433.

The elliptical word balloons 431 are most widely used in Oriental cartoons to mainly represent ordinary conversations or conversations in a declarative sentence. Shapes of the elliptical word balloons 431 are modeled by an elliptical expression as in Equation 7, wherein a and b denote a semi-major axis and a semi minor axis, respectively. In Equation 7, a shape of an ellipse depend on an integer d and a radius of the ellipse is determined to enclose all lines:

$$\left(\frac{x}{a}\right)^d + \left(\frac{y}{b}\right)^d = 1 \qquad \text{Equation 7}$$

The shouting word balloons 432 mainly represent hero/heroine's emotions or current atmosphere. The shouting word balloons 432 include four types of word balloons, i.e., sensation, emphasis, shout and cloud word balloons, each of which describe hero/heroine's mental states or ambient situations. The sensation word balloon represents a situation in which the hero/heroine is surprised by any fact or cannot believe the fact, and the emphasis word balloon represents a situation in which the hero/heroine says with firm tone or emergency occurs. The shouting word balloon is used in the case where the hero/heroine shouts, and the cloud word balloon is used in a situation where the hero/heroine carefully considers something.

In the cartoon, when the word balloon crosses a boundary area of a cartoon cut, a word balloon attached to the boundary area is used to increase readability of hero/heroine's lines. In the present invention, such word balloon is referred to as a boundary-area word balloon 433. When the word balloon is located near the boundary area of the cartoon cut, it is rendered into the boundary-area word balloon 433.

After the word balloon is rendered, a word end is necessary for coupling the word balloon and the cartoon hero/heroine. In the present invention, the word end is modeled using two Bezier curves. Creation of the word end requires a reference point $r_i$ of a hero/heroine's location and a center location $c_i$ of the word balloon, and the word end is implemented by the following computation:

1. Calculate a straight line including a reference point $r_i$ and a center point $c_i$ and then calculate a point p where the straight line meets a body of the word balloon.
2. Obtain a tangent line l of the ellipse, i.e., the body of the word balloon, at the point p, and obtain points $m_1$ and $m_2$ on the tangent line l by moving from the point p by a specific ratio α in directions toward both ends of the line l.
3. Calculate straight lines including the points $m_1$ and $m_2$ and the center point $c_i$, respectively, and set points $t_1$ and $t_2$ at which the straight lines cross the body of the word balloon as starting points of a word end.

There are two to four word balloons in average in one cartoon cut. Most of the word balloons have been manually placed as intended by a cartoonist. However, the word balloons are automatically placed in the present invention.

Most cartoon readers first read lines in the word balloon located at the left rather than the right and at the upper side rather than the lower side on one scene. That is, a word balloon reading order depends on locations of the word balloons. In the present invention, the word balloons are placed in the reading order using an EPFLP (Extended Point-Feature Label Placement) method and a heuristic method using a QLayout evaluation function. In FIG. 6, areas where respective word balloons can be placed are represented by the EPFLP. To meet the reading order rule, an area where a word balloon $b_2$ having a reading order of 2 can be placed is limited to an area $EP_{2,3}$ by a word balloon $b_1$ having a reading order of 1. QLayout reflects distances between the word balloons and between the reference point and the word balloons and serves as an index for evaluating readability of word balloons in the cartoon. An evaluation value increases as the word balloons are spaced farther from one another while each word balloon is placed nearer the reference point thereof.

However, when word balloons are automatically placed by the EPFLP and the QLayout, a candidate area where a word balloon can be placed is limited to rectangular regions above and below an area where another word balloon has been already placed. Therefore, in the present invention, virtual force acting between word balloons is additionally considered to extend the candidate area. A pseudo code of word balloon placement algorithm is as in Table 1.

TABLE 1

```
repeat
    select the farthest w.b. from its own r.p.
    move w.b. toward its own r.p.
    calculate force of each w.b.
    apply force to each w.b.
    make v.b. of each w.b.
    if v.b meet i.b. then
        calculate the v.b. area out of i.b.
        convert w.b. into boundary w.b.
    end-if
    calculate QLayout
until RO regulation is O.K. and Qlayout is more bigger than old
Qlayout.
```

In the present invention, cartoon elements other than the word balloons are stored in the cartoon information DB 108, so that they can be used during the cartoon production procedure. The cartoon elements also include the exaggerated letters 434 shown in FIG. 5. The exaggerated letters 434 are stylized letters representing loud voice, e.g., shout, for use in directing a more animated scene. In the present invention, stylization of letters is implemented by changing fonts and sizes of letters and inserting them into a frame.

In the cartoon, background processing is required to direct atmosphere of the scene better. In FIG. 5, the exaggerated background 435 is shown as an example of the background processing. In the present invention, the background processing was performed using textures in the cartoon information DB 108. For the background processing, three background textures (concentration, gloom and panic effects) frequently used in the cartoon scene are stored in the cartoon information DB 108. Each of the textures can be represented differently depending on a sense and level of the effect by using parameters therefor.

Unlike movies or dramas, the cartoon is a set of stationary images. Therefore, the speedline 436 shown in FIG. 5 is used to represent motion of an object. The present invention supports drawing the speedline 436 in consideration of a motion direction, a virtual speed, and the like of the object.

Figure 7:
FIG. 7 illustrates an exemplary cartoon as a final result in accordance with the embodiment of the present invention.

One cartoon page is completed (step S290), when a cartoon stylization procedure is finished by completing one frame through the cartoon element insertion step S270 and filling the rest frames of the page in the same manner. When the cartoon consists of several pages, the process may return to the cartoon stylization step S280 for other pages. FIG. 7 illustrates an exemplary cartoon as a final result in accordance with the embodiment of the present invention.

While the invention has been shown and described with respect to the embodiments, it will be understood by those skilled in the art that various changes and modification may be made without departing from the scope of the invention as defined in the following claims.

What is claimed is:

1. An apparatus for producing digital cartoons comprising:
    an image collection unit configured to collect photorealistic image data;
    a cartooning processor configured to perform a rendering process including image abstraction and edge generation on the photorealistic image data collected by the image collection unit to generate cartooned images; and
    a stylization unit configured to produce a cartoon page having various shapes of cartoon frames, resizing the cartooned images to place the resized images into the cartoon frames and adding cartoon elements to the images placed in the cartoon frames,
    wherein the cartoon elements include word balloons having word ends, and the stylization unit is configured to determine a location of the word ends using a reference point, a center of a word balloon, and a tangent line of the word balloon.

2. The apparatus of claim 1, wherein the image abstraction includes simplification of colors in the photorealistic image data.

3. The apparatus of claim 2, wherein the image abstraction is performed using bilateral filtering and mean-shift segmentation.

4. The apparatus of claim 1, wherein the edge generation is performed using Laplacian filtering and Canny edge detection to generate edges on contours of objects in the photorealistic image data.

5. The apparatus of claim 1, wherein the photorealistic image data are images taken by a digital camera or extracted from scenes of two-dimensional based movies or dramas.

6. The apparatus of claim 1, wherein the cartoon elements further include backgrounds, letters and speedlines.

7. The apparatus of claim 1, wherein the word balloons are automatically placed in each cartoon frame depending on a sequence of lines of cartoon characters in the cartoon frame by using an EPFLP (Extended Point-Feature Label Placement) method and a heuristic method using a QLayout evaluation function.

8. A method for producing digital cartoons, the method comprising:
    collecting photorealistic image data using an image collection unit;
    performing a cartooning process, using a cartooning processor, on the photorealistic image data to generate a cartooned image;
    performing a stylization process, using a stylization unit, on the cartooned image to complete a cartoon page, wherein the cartooned image includes cartoon elements, and the cartoon elements include word balloons having word ends; and
    determining a location of the word ends, using the stylization unit, by using a reference point, a center of a word balloon, and a tangent line of the word balloon.

9. The method of claim 8, wherein performing a cartooning process includes:
    abstracting the photorealistic image data to simplify colors in the photorealistic image data; and
    generating edges on contours of objects in the abstracted photorealistic image data.

10. The method of claim 9, wherein abstracting the photorealistic data is performed using bilateral filtering and mean-shift segmentation.

11. The method of claim 9, wherein generating the edges is performed using Laplacian filtering and Canny edge detection.

12. The method of claim 8, wherein performing the stylization process includes:
    producing a cartoon page having various shapes of cartoon frames;
    resizing the cartooned images to place the resized images into the cartoon frames; and
    adding cartoon elements to the images placed in the cartoon frames.

13. The method of claim 12, wherein the cartoon elements further include backgrounds, letters and speedlines.

14. The method of claim 8, wherein the word balloons are automatically placed in each cartoon frame depending on a sequence of lines of cartoon characters in the cartoon frame by using EPFLP (Extended Point-Feature Label Placement) method and a heuristic method using a QLayout evaluation function.

* * * * *